US009488725B2

United States Patent
Max et al.

(10) Patent No.: US 9,488,725 B2
(45) Date of Patent: Nov. 8, 2016

(54) METHOD AND DEVICE FOR DETECTING OBJECTS IN THE SURROUNDINGS OF A VEHICLE

(71) Applicant: Volkswagen Aktiengesellschaft, Wolfsburg (DE)

(72) Inventors: Stephan Max, Gifhorn (DE); Claudia Prausse, Braunschweig (DE); Alexander Urban, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 192 days.

(21) Appl. No.: 14/476,016

(22) Filed: Sep. 3, 2014

(65) Prior Publication Data

US 2014/0369168 A1  Dec. 18, 2014

Related U.S. Application Data

(63) Continuation of application No. PCT/EP2012/075540, filed on Dec. 14, 2012.

(30) Foreign Application Priority Data

Mar. 3, 2012 (DE) .......... 10 2012 004 396

(51) Int. Cl.
*G01S 15/04* (2006.01)
*G01S 15/93* (2006.01)
*G01S 7/539* (2006.01)
*G01S 15/87* (2006.01)

(52) U.S. Cl.
CPC .......... *G01S 15/04* (2013.01); *G01S 7/539* (2013.01); *G01S 15/878* (2013.01); *G01S 15/931* (2013.01); *G01S 2015/932* (2013.01)

(58) Field of Classification Search
CPC ........ G01S 15/04; G01S 15/06; G01S 15/10; G01S 15/878; G01S 15/931; G01S 15/932; G01S 7/539; G01S 2015/932
USPC .............. 367/90, 93, 8, 100, 107, 116, 129; 340/435, 436, 901, 903; 701/1, 36, 701/300–301
See application file for complete search history.

(56) References Cited

U.S. PATENT DOCUMENTS 6,128,576 A * 10/2000 Nishimoto .......... G01S 7/56
340/435
6,157,403 A * 12/2000 Nagata ............ G01S 15/46
348/171

(Continued)

FOREIGN PATENT DOCUMENTS

| DE | 103 35 601 A1 | 3/2005 |
| DE | 103 44 299 A1 | 4/2005 |
| DE | 10 2006 008 636 A1 | 8/2007 |

(Continued)

*Primary Examiner* — Hung T Nguyen
(74) *Attorney, Agent, or Firm* — Muncy, Geissler, Olds & Lowe, P.C.

(57) ABSTRACT

A device and a method for detecting objects in the surroundings of a vehicle is provided. At least one reflection pattern is ascertained for at least one object class. Pulse echo measurements for m different transmitter/receiver geometries are performed. Echo signals in the pulse echo measurements are detected. Weights for the different objects of the corresponding class are calculated. The weight values thus ascertained are summed to form a weight, and the presence of objects of the at least one object class is ascertained using the weights thus ascertained.

10 Claims, 6 Drawing Sheets

(56) References Cited

U.S. PATENT DOCUMENTS

| 8,731,816 | B2 | 5/2014 | Dintzer et al. | |
| 2003/0141967 | A1* | 7/2003 | Aichi | B60N 2/4876 340/435 |
| 2006/0009883 | A1* | 1/2006 | Takeichi | G01S 15/931 701/1 |
| 2010/0097200 | A1 | 4/2010 | Hilsebecher et al. | |
| 2010/0149923 | A1* | 6/2010 | Bigliardi | G01S 15/526 367/100 |

FOREIGN PATENT DOCUMENTS

| DE | 10 2008 041 679 A1 | 3/2010 |
| EP | 1 557 694 A1 | 7/2005 |
| WO | WO 2010/121582 A1 | 10/2010 |

* cited by examiner

METHOD AND DEVICE FOR DETECTING OBJECTS IN THE SURROUNDINGS OF A VEHICLE

This nonprovisional application is a continuation of International Application No. PCT/EP2012/075540, which was filed on Dec. 14, 2012, and which claims priority to German Patent Application No. 10 2012 004 396.1, which was filed in Germany on Mar. 3, 2012, and which are both herein incorporated by reference.

BACKGROUND OF THE INVENTION

Field of the Invention

The invention relates to a device and a method for detecting objects in the surroundings of a vehicle.

Description of the Background Art

For modern support functions and systems in motor vehicles, such as automatic parking systems for example, a knowledge of the vehicle's environment is required. Automatic parking systems are capable of assisting a driver in parking the vehicle or of carrying out the entire parking process without driver intervention. In order to be able to execute such a fully automatic process, it is necessary for the vehicle to acquire measurement results concerning objects in the environment by means of contactless sensors and thus to be able to reliably identify regions that are occupied by objects and are not available for a parking process, and which regions or areas are clear of objects and can be used for carrying out the parking process. It is customary to mark regions or points in the vehicle's environment where the presence of an object is detected using the measurement results as occupied in a map of the environment. The occupancy information can be specified in the form of a probability that the region of the environment corresponding to the map region is occupied by an object, for example.

Contactless measurement methods frequently operate using the a pulse echo measurement method, in which either a sound pulse or a pulse of electromagnetic radiation is transmitted and is then reflected at the surface of the objects present in the environment. These reflected echo pulses are sensed in a time-resolved manner by the measurement sensors. If electromagnetic radiation is used, depending on the frequency range one speaks either of a radar measurement (radar: radio detection and ranging) or a lidar measurement (lidar: light detection and ranging). With radar and lidar measurements, it is possible to transmit the electromagnetic radiation aimed in a tightly delimited angular region. Using the transit time, which is to say the time between the transmission of the pulse and the reception of the echo pulse, the distance to the object that has reflected the transmitted pulse can be inferred when the propagation velocity of the transmitted pulse or of the echo pulse in the environment is known. In the case of radar and lidar measurements, the direction of emission is generally changed for successive measurements, and thus the environment is progressively scanned using the echo pulses emitted in different solid angle regions and received from these solid angle regions.

When using sound sensors, which emit sound signals in the ultrasonic frequency range, sound is generally radiated in a relatively large angle region and is also received by the sensors from a relatively large angle region. Consequently, based on a measurement using the time period between the transmission of the pulse and the arrival of the first echo pulse it is only possible to establish that an object is present on a section of an ellipse, where the ellipse is characterized in that the transmitter and the receiver are located at the foci of the ellipse. The size of the ellipse is determined by the transit time of the echo pulse. If a sensor that serves as both transmitter and receiver is used, the elliptic curve becomes a circular arc. In order to be able to ascertain the position of the object more precisely, the evaluation of multiple measurements for different detection geometries is necessary. A detection geometry, also referred to as a measurement geometry or transmitter/receiver geometry, is defined by the location of the transmitter and the location of the receiver and, if applicable, an emission geometry or receiving geometry insofar as these are alterable, relative to a coordinate system that is coupled to the environment in a fixed manner. Different measurement geometries are thus obtained, for example, by the means that the transmit signal from a sensor is measured with receiving sensors located at various locations or by the means that the transmitting sensor and/or the receiving sensor is positioned at a different place with respect to the stationary coordinate system.

The superposition of multiple different measurement results in the image space, which is to say the superposition of the elliptical or circular-segment-shaped curves on at least one point of which a localized object is located based on the relevant measurements for the purpose of exact position determination, is called lateration. The superposition of three measurement results is necessary in order to be able to uniquely localize a point emitter, which is to say an object that is not spatially extended. Consequently, position determination is also called trilateration. Since objects in real environments of vehicles are generally extended objects, a correct sensing of the environment is resource-intensive and difficult, and could be significantly improved if it were possible to determine, using a small number of measurement results, what geometry an object in the environment has or what class of objects defined by geometric shape it should be assigned to.

A method for classifying objects is known from EP 1 557 694 A1. In the method described there for classifying objects that represent items in the detection area of a sensor for electromagnetic radiation, in particular a laser scanner, based on at least one distance image of the detection area with distance image points, each of which was obtained by transmitting a pulse of electromagnetic radiation and detecting a pulse returned as an echo pulse from a point or area on an object and detecting at least one echo pulse characteristic dependent on the energy of the echo pulse, and each of which is assigned at least one value for a parameter for the echo pulse characteristic, distance image points of the distance image are associated with at least one object and the object is assigned an object class as a function of at least one of the parameter values for the echo pulse characteristic. In this way, pedestrians, passenger cars, trucks, and the like, for example, are to be distinguished from one another.

A method for classifying objects as obstacles and non-obstacles for vehicles is specified by WO 2010/121582 A1, which corresponds to U.S. Pat. No. 8,731,816. The vehicle includes an environment sensor that senses stationary and moving objects in a scene in front of the vehicle and, if applicable, tracks a path of movement of the objects. The method provides one or more observers, wherein an observer classifies an object according to predefined features, and in the case of multiple observers contributes to an overall classification result. An observer senses the path of movement of vehicles in an environment of at least one stationary object and classifies the stationary object as a function thereof. In this way, for example, vehicles on the roadway are to be distinguished from sign gantries that can be driven beneath and the like.

Known from US 201000097200 A1 are a method and a device for identifying and classifying objects. Here, electromagnetic radiation is transmitted by a sensor and the components reflected at an object are received by the sensor. The received signals are analyzed by comparison with stored characteristic values, and classification of the objects is performed on the basis of the analysis. To this end, an analyzer is provided with a memory in which are stored characteristic patterns that are compared with the received signals in order to classify the reflecting objects on this basis. In this way, for example, passenger cars, trucks, traffic signs or discarded cans are to be classified with regard to type.

Known from DE 10 2008 041 679 A1 are a method and a device for memory-based environment recognition. What is described is environment recognition for a moving system, wherein at least one sensor attached to the moving system is used, in which at least one object or feature in the environment of the system is recognized at a first point in time by an imaging method, wherein data of the at least one of these objects or features are stored in a memory, wherein after at least one possible sighting of this at least one object or feature at an at least second point in time a classification of this at least one object or feature takes place with the aid of a comparison of the data stored in the memory. In this way, objects in environments which are traveled frequently, for example, are to be classified.

A method for object classification using a 3D model database is known from DE 103 35 601 A1. What is described is a method for computer-aided classification of three-dimensional objects into one or more object classes, in which an object is sensed by a measurement device. In order to make the method more efficient and reliable, the method described is based on the fact that the measured data are 3D data, that a sensed measured data point cloud of 3D data is compared with stored 3D model data (the archetype of the relevant object class) and matched by variation of the 3D location of the model in space to the measured point cloud, and then the classification in the best-fitting class takes place. In this way, for example, pedestrians, bicyclists, passenger cars and trucks are to be classified with regard to their obstacle or object type.

SUMMARY OF THE INVENTION

It is therefore an object of the invention to providee a method and a device with which classification of objects with regard to geometric shapes is possible.

In an embodiment, the invention is based on the idea that it is possible for many geometric objects to classify them using a few parameters. For example, straight lines can be described with reference to a reference point according to what is called the Hesse normal form by a distance d to the reference point from its perpendicular point of a perpendicular passing through the reference point and an angle of the perpendicular with respect to an axis, for example an abscissa of a coordinate system. If one treats both the distance and angle as parameters, then the straight lines in the environment of the reference point can each be identified by these two parameters of distance to perpendicular point and angle of intersection with a coordinate axis. For practical reasons it is advantageous to consider only a grid of straight lines, in other words to discretize the space or the parameters. Preferably a discretization is selected that is simple to implement in the parameter space. For example, the straight lines whose distance lies in a specific interval are examined, wherein only specific distances in this interval that subdivide the interval into uniform sections are examined. Similarly, the angular range is resolved or discretized with an angular resolution of a specific number of degrees, for example one degree.

In this discussion, objects with the same geometric shape represent a class of objects that can be represented in a parameter space. For example, circular objects in the environment can be uniquely identified by means of three parameters: a distance to the center point from a reference point, an angle of a connecting line from the reference point to the center point of the circle with respect to a defined coordinate axis, for example an abscissa, and the radius of the circle. A number of other objects can be uniquely parameterized in this way.

If one first considers by way of example an object, for example a straight line as parameterization of an infinitely extended straight wall in two-dimensional space, then for a given mapping geometry that is defined by the location of the transmitter and receiver and if applicable their emission and receiving characteristics it is possible to predict the point on this object under consideration at which a reflection will occur. Associated with this is a transit time at which an echo pulse would occur in the echo signal of a pulse echo measurement. Thus, the echo signal value that corresponds to this expected transit time provides a measure of the evidence that this straight line under consideration is present in the environment. Consequently, only the echo signal value in the echo signal at this one expected point in time is of relevance for the reflection geometry and this line under consideration. This analysis can now be carried out for all parameter sets, which is to say all parameter value tuples that characterize an object of this object class, straight lines in this case, so that for a transmitter/receiver geometry, also called a measurement geometry, one can calculate a reflection pattern that assigns to the individual parameterized objects the corresponding expected transit times, or in the case of digitization of the echo signals index values that identify transit times at reflection points at which a reflection of the pulse signal occurs if the corresponding object parameterized by the tuple is present by itself in the environment with the corresponding measurement geometry, which is to say the transmitter/receiver geometry. Now, if multiple pulse echo measurements are performed for different transmitter/receiver geometries, i.e., measurement geometries, then the corresponding reflection pattern can be calculated for each of these transmitter/receiver geometries. In order to identify objects in the environment, multiple such echo signals for different transmitter/receiver geometries, sensed in time sequence, or in part simultaneously when multiple receiving sensors are used, are analyzed for the individual objects possibly present that are considered in the parameter space, and weights are calculated for each of the individual objects that provide a measure for the presence of the corresponding object in the environment. To this end, for an object that is identified by a parameter value tuple, the corresponding expected transit time or transit times for each receiving geometry based on the reflection pattern are extracted from the reflection pattern, and the echo signal values corresponding to these expected transit times are summed. For example, in the case of the straight line discussed here by way of example, if exactly one expected transit time exists per object, then exactly one echo signal value from each echo signal is used to form the sum of the echo signals that specifies the weight for the object characterized by the parameter value tuple. Thus, for each object examined, or each tuple characterizing the corresponding object, one obtains a weight that is the sum of the corresponding echo signal values at the expected transit times in each case based on the associated reflection pattern. Using these weights, it is then possible to determine whether an object or objects, and if applicable which ones, is or are present in the environment that was measured. Use of the echo signal values to produce the total weight represents only one possible embodiment. In general, a weight value is ascertained using the echo signal value or values and the weight values are summed to form the total weight. The total weight is also referred to as weight.

The individual weight values can be determined using the echo signal values in an environment around the expected transit time. The weight value can be a standard value or can depend on the signal intensity of the echo pulse. A standard value can be assigned when an echo pulse is considered to be present. This can be ascertained using a comparison with a threshold value. In like manner, a standard echo pulse whose pulse center point coincides with the expected transit time can be compared with the echo signal. A measure for an overlap or match of the standard pulse with the echo pulse in the echo signal can be used as a weight. There are many other possibilities for determining the individual weight values.

In particular, therefore, a method for detecting objects in an environment of a vehicle is proposed that comprises the following steps: ascertaining at least one reflection pattern for at least one class of object, wherein a reflection pattern for a transmitter/receiver geometry of a pulse echo measurement assigns to each object of the object class in the environment characterized by a parameter value tuple one or more expected transit times at which an echo pulse is expected in the echo signal if only the corresponding object characterized by the parameter value tuple is present in the environment; performing pulse echo measurements for different transmitter/receiver geometries and detecting echo signals in these pulse echo measurements; calculating weights for the different objects of the at least one class characterized by the parameter value tuple by the means that the echo signal value or values for each echo signal is or are ascertained for each point or points in time that correspond to the expected transit time or transit times that is or are assigned to the parameter value tuple using the reflection pattern associated with the echo signal, and the echo signal values thus ascertained or the weight values derived from the ascertained echo signal values are summed to form the weight; and the presence of objects of the class is ascertained using the weights thus ascertained.

A corresponding device comprises at least one pulse echo measurement device that supplies an echo signal at each pulse echo measurement, as well as a controller that comprises a memory device in which a reflection pattern for at least one object class can be stored or is stored for each transmitter/receiver geometry, and also a computing unit to process the obtained echo signals according to the above-described method. In this system the processing can be performed under program control by means of a programmable computing unit or in a parallelized manner in a computing unit created especially for this purpose, for example an at least partially programmable field programmable gate array. Especially when the pulse echo measurement device comprises at least multiple receiving sensors or multiple transmitters, or both multiple transmitters and receivers, so that pulse echo measurements for different transmitter/receiver geometries are possible without movement of the measurement device itself, the reflection patterns required for the object classes can be advantageously precalculated and thus can also be implemented in a circuit in a suitable manner. For example, if ultrasonic transducers that can be used as both transmitters and receivers are employed, then in measurement devices that comprise multiple ultrasonic transducers of this type that are arranged rigidly in space with respect to one another, individually producible echo signals are mutually redundant, which is to say that cross-correlations are always used in which one and the same ultrasonic transducer is not used as transmitter and receiver. For example, if one numbers the ultrasonic transducers, then the following applies: the echo pulse signal captured by ultrasonic transducer 2 while ultrasonic transducer 1 is used as transmitter is redundant to the echo signal captured by ultrasonic transducer 1 while ultrasonic transducer 2 is used as transmitter. It is assumed here that the measurement device is at rest relative to the environment. Such redundant echo signals thus do not need to be either detected or analyzed.

With regard to a rapid analysis, embodiments are preferred in which the pulse echo measurement device comprises multiple transmitters and/or multiple receivers, in particular preferably multiple measurement sensors usable as transmitters and receivers, in particular ultrasonic transducers, which are rigidly located relative to one another. For the echo signals that can be generated herewith for different transmitter/receiver geometries, the reflection patterns for the individual objects under consideration can be precalculated, so that a computing effort at the time of the measurement is considerably reduced.

In an embodiment of the method, the at least one reflection pattern and preferably also the other reflection patterns for the individual transmitter/receiver geometries are calculated before detection of the echo signals.

If the pulse echo measurement device comprises only one transmitter and one receiver, for example one measurement device, in particular one ultrasonic transducer, or if the number of echo signals analyzed with a measurement device having multiple transmitters and/or receivers is to be further increased, then other measurement geometries or transmitter/receiver geometries can be produced by the means that the measurement device is moved in space, which is to say relative to a stationary coordinate system. In a vehicle, this takes place during travel in any case. In such a case, the reflection patterns associated with the individual measurement geometries depend on the motion of the vehicle in the environment, in which the parameterized objects are assumed to be stationary. This is equivalent to the requirement that the parameter value tuple must in each case identify the same object assumed to be stationary. Although the relative arrangement of transmitters and receivers does not change, the transmitter/receiver geometries, which is to say the positions of the measurement sensors in the environment, change on account of the relative motion. Thus, the associated reflection patterns also change with the vehicle motion. Nonetheless, these can be adapted to the new geometric conditions by simple arithmetic operations. For example, in the parameterization of straight lines a translation in space causes a change in the corresponding perpendicular point distance relative to the position of the transmitter and receiver that depends on the angle of the straight line in the stationary coordinate system. In contrast, a rotation in space causes only a displacement in parameter space. It is thus advantageous in such a situation to calculate the at least one transfer characteristic, which is to say the reflection geometry or the reflection pattern, for the full angular range from 0° to 360° in parameter space. However, since the translation results "in a distortion" of the reflection pattern as the measurement device moves further from the original reference point in the stationary coordinate system, a regular tracking of the reference point is necessary. Alternatively, it is possible to use the same reflection pattern in each case, but prior to calculation of the weights using the traversed trajectory having one or more values to transform the weight values derived from an echo signal to one another, which are then detected in different parameter spaces with respect to a moving reference point, before producing a total weight, which is to say the weight from multiple measurements, which is to say the weight values for different echo signals.

A presence of an object can be ascertained using a threshold condition for the corresponding weights of the relevant class.

Oftentimes, however, the real, existing objects differ from idealized objects used for classification, especially with respect to their extent. Thus, infinitely long, extended surfaces that correspond to objects approximated by straight lines rarely occur in the real environment of motor vehicles. With regard to a detection area that is only limited, in particular that of a possible parking space when driving past on the right and/or left side of the vehicle, the approximation of a side wall of a vehicle by a straight line is entirely reasonable. If the straight, flat surface is shorter in its longitudinal extent than the detection area, then it would be desirable to be able to ascertain its extent. To this end, provision is made in a preferred embodiment of the method for an extent of a detected object to be ascertained by the means that tests are made in the individual echo signals to determine whether or not the echo signal value for the point in time corresponding to the expected transit time, or the echo signal values for the points in time corresponding to the expected transit times that, based on the reflection pattern associated with the echo signal, is or are assigned to the parameter value tuple characterizing the detected object exceed a predefined quantity, for example an additional threshold value, and an echo signal value below this predefined quantity or the predefined additional threshold value is taken as an indicator that the detected object does not extend to the reflection point at which a reflection of the transmit pulse at the detected object takes place in the associated transmitter/receiver geometry if this object is completely extended according to the assumption underlying the parameterization as a parameter value tuple. If expected echo pulses are not present in individual echo signals for a detected object, the conclusion is thus drawn that the detected object does not extend to the associated reflection point. The longitudinal extent can thus be ascertained.

Another advantage of the method resides in the fact that detected objects can in effect be removed from the echo signals. Consequently, provision is made in one embodiment that modified echo signals are generated by the means that each of the signal components associated with detected objects are removed from the echo signal. This can be accomplished, for example, by the means that the echo signal values for the points in time corresponding to the expected transit times that are defined for the reflection geometry and the detected object are set to zero or that a standard signal pulse is subtracted at those positions.

In particular, it is possible to redo the analysis with the modified echo signals and to recalculate the weights so that additional objects of the same class or objects of a different class providing a weaker signal can be ascertained. It is a matter of course that these steps can be carried out repeatedly and also iteratively for the same or different classes of objects.

Moreover, a multilateration, for example a trilateration, can also be performed using the modified signals in order to detect additional objects in the environment.

In like manner, it is possible in one embodiment to insert the detected objects into a map of the environment in which each spatial cell is assigned a probability, to perform the insertion using a probability approach, for example based on the Bayesian theorem, wherein the spatial points corresponding to the contour of the detected object are first assigned an existence probability for the object.

In an embodiment, provision is made that weights for the presence of objects are separately determined for at least two classes of objects, and these determinations are carried out essentially simultaneously with the same unmodified or identically modified echo signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
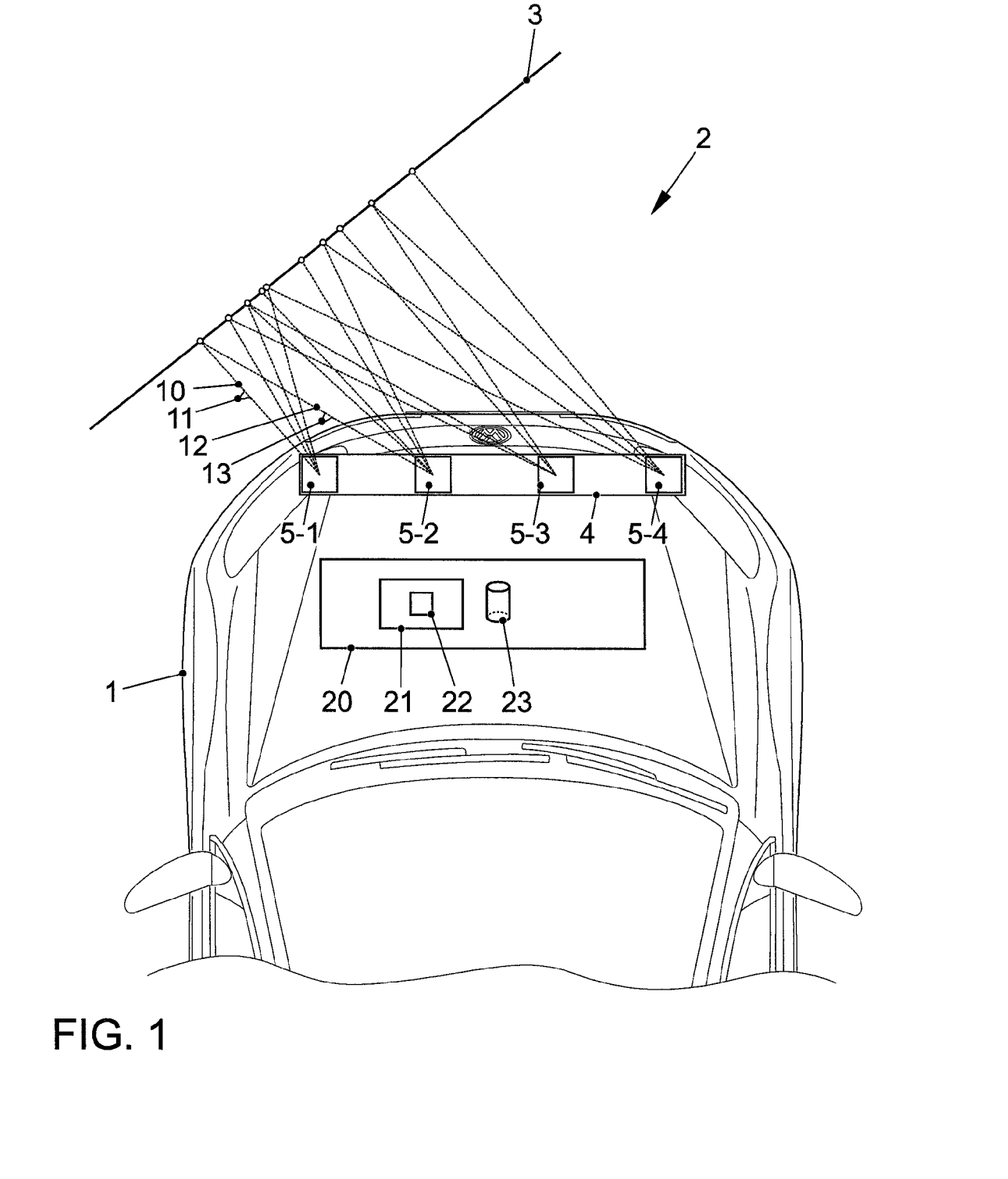
FIG. 1 is a schematic representation of a vehicle with a measurement device in its environment.

FIG. 1 schematically shows a motor vehicle 1 that is located in an environment 2. Located in the environment 2 of the motor vehicle is a flat surface that can be represented by a straight line 3. The motor vehicle 1 includes a pulse echo measurement device 4 that comprises four measurement sensors 5-1 to 5-4 serving as transmitters and receivers. These measurement sensors 5-1 to 5-4 can be sound transducers, for example, that can serve as ultrasonic transmitters and as ultrasonic receivers. The pulse echo measurement device 4 is designed to transmit a transmit signal 10 with a transmit pulse 11 into the environment 2 through one of the measurement sensors 5-1 to 5-4. This signal is reflected at the flat surface approximated as straight line 3 so that a reflected echo signal 12 with one or more echo pulses 13 is reflected back to each of the measurement sensors 5-1 to 5-4. The measurement sensors 5-1 to 5-4 thus each receive one echo signal. This received and, if applicable digitized, signal is also called an echo signal.

A solution to the Huygens diffraction integral for extended surface reflectors shows that the reflection obeys a reflection law which states that the angle of incidence of the reflected radiation with regard to the surface normal is equal to the angle of reflection of the reflected signal with regard to the surface normal at a reflection point. If a signal is sent from one of the measurement sensors 5-1 to 5-4, for example a measurement sensor 5-1, then there are four signal paths back to the different measurement sensors 5-1 to 5-4. If one performs pulse echo measurements by using each of the various measurement sensors once in offset time sequence as transmitter, it is found for the problem illustrated graphically here, for example, that there are ten different signal transmission paths. This means that there are ten reflection points on the flat surface approximated as a straight line for the different signal propagation paths that arise. Since the signal propagation path from one sensor to the other sensor is the same as the propagation path from the other sensor to the one sensor, some echo pulses of different echo pulse measurements are equal. Overall, with N sensors, I non-redundant transmission paths are measured.

$$I = \frac{(N+2-1)!}{2!(N-1)!},$$

The echo signals detected by the pulse echo measurement device 4 are sent to a controller 20, which comprises a program-controlled computing unit 21, for example. This can comprise, for example, a processor 22 that is coupled to a memory 23 in which is stored an executable program code that defines the functionality of the controller 20. Reflection patterns for different object classes are stored in the memory 23, for example in the form of tables. The computing unit 21 can also be implemented as a wired circuit. The reflection pattern can likewise be stored therein, at least in part, in the embodiment as a circuit. The presence of a memory is then not absolutely required. As explained below, the reflection patterns are used to determine weights for the objects of at least one object class possibly present in the environment 2 with the aid of the detected echo signals, and to determine with the aid of the weights thus ascertained whether an object of a class is present in the environment, and if applicable which one. Furthermore, a map of the environment in which the detected objects are entered can be stored in the memory 23. In addition, the controller 20 can have the functionality of also analyzing the echo signals according to other known methods in order to obtain additional information for creating a map of the environment and for integrating therein. The controller 20 can be combined with the pulse echo measurement device 4 in such a manner that the individual pulse echo measurements are also controlled by the controller 20.

The analysis of the pulse echo measurement signals—which are referred to here as echo signals—is performed in that the environment is tested for the existence of objects of at least one class of objects. To this end, it is necessary to parameterize the objects of a class. This shall be explained below for straight lines by way of example.

Figure 2:
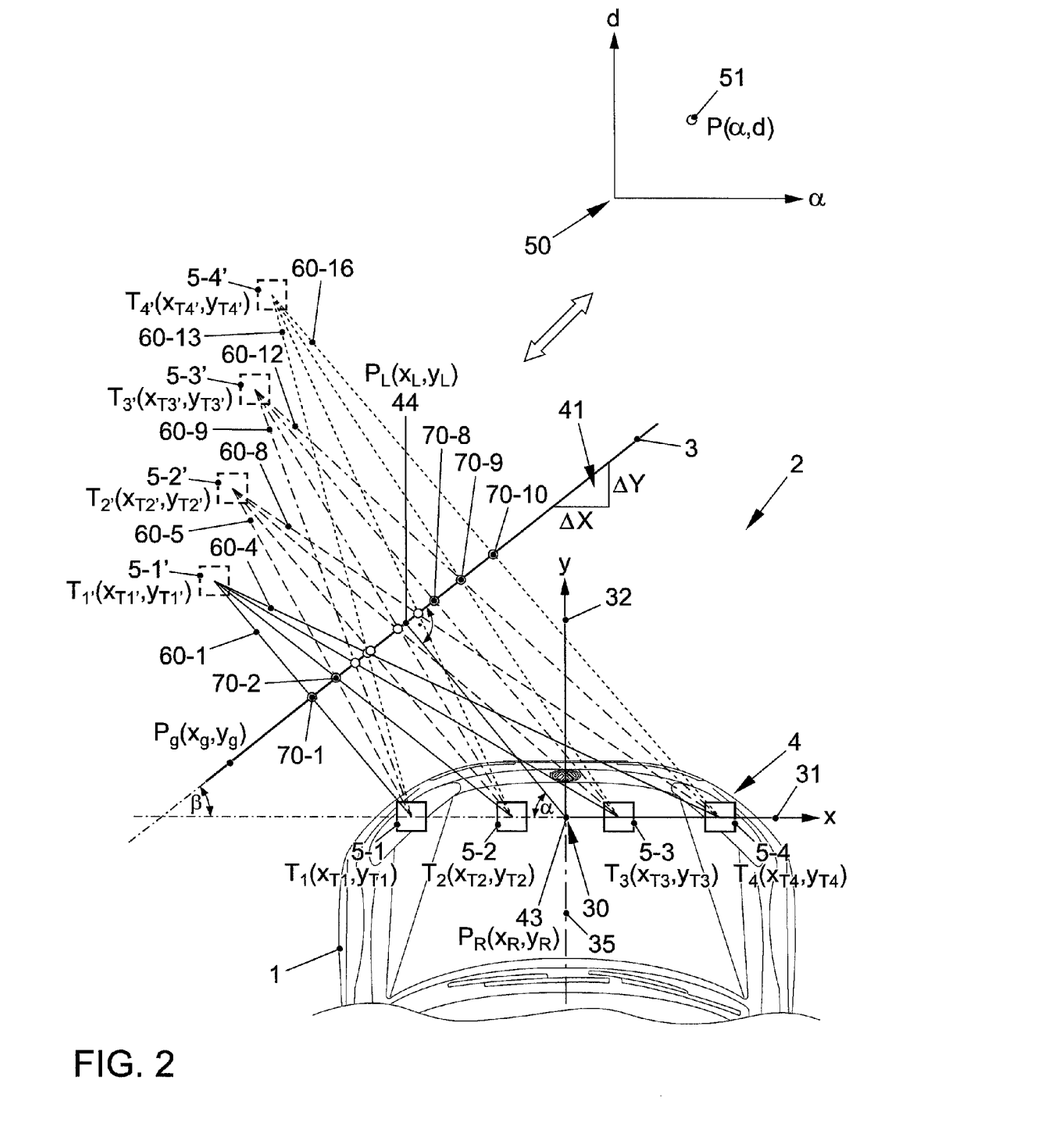
FIG. 2 is a schematic representation of a vehicle with a measurement device in an environment that includes a straight line for explaining the signal propagation paths that occur and for explaining the assignment of an object to a point in a parameter space.
Figure 3A:
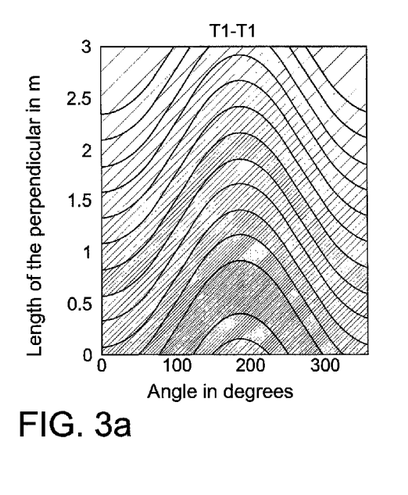
FIG. 3a-3d are graphic representations of reflection patterns.
Figure 3B:
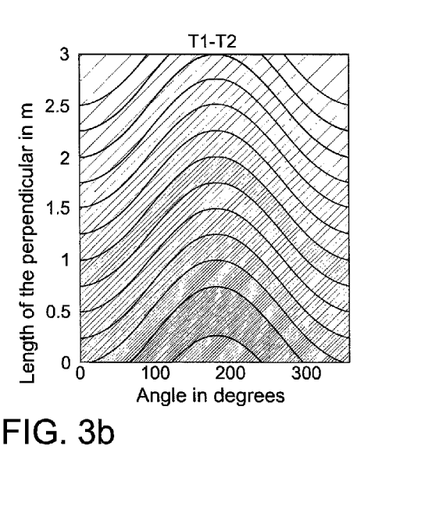
Figure 3C:
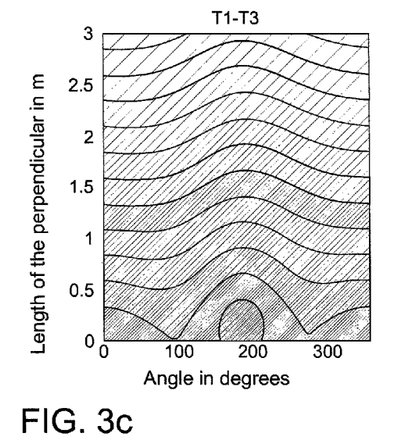
Figure 3D:
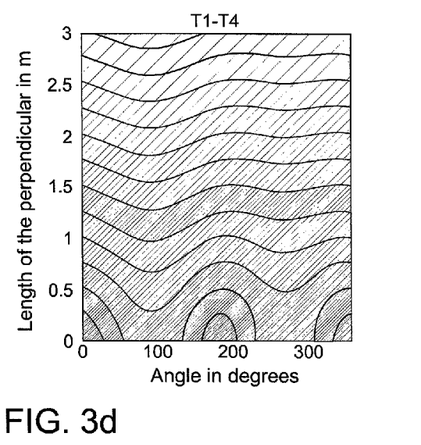
Figure 4A:
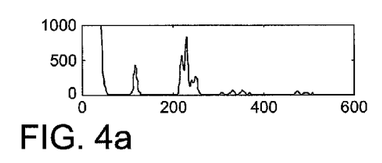
FIG. 4a-4j illustrate example graphic representations of echo signals sensed in a time-resolved manner.
Figure 4B:
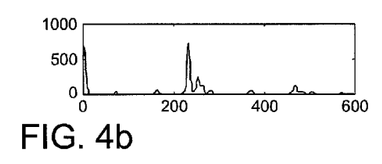
Figure 4C:
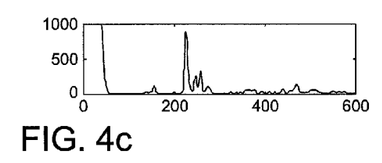
Figure 4D:
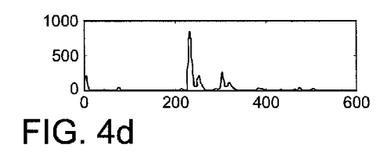
Figure 4E:
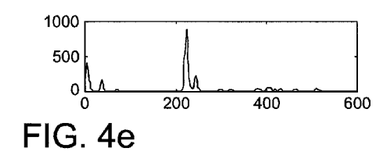
Figure 4F:
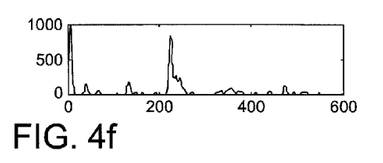
Figure 4G:
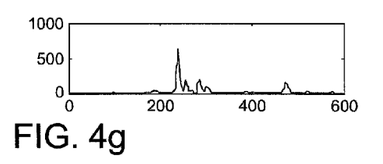
Figure 4H:
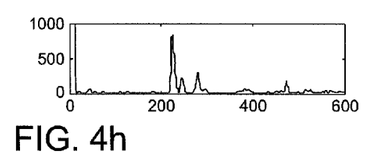
Figure 4I:
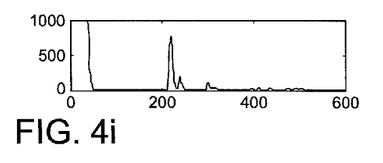
Figure 4J:
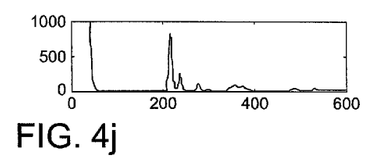

Shown in FIG. 2 is a straight line 3 in the environment 2 of the motor vehicle 1. Identical technical features are labeled with the same reference characters in the Figures. Linked to the environment 2 is a stationary coordinate system 30, which has an x-axis 31 and a y-axis 32. First, a reference point 43 with the coordinates ($x_R$, $y_R$) is defined. By way of example, this reference point is chosen on the vehicle center axis 35, centered between the measurement sensors of the pulse echo measurement device 4, which is aligned on a line 36 perpendicular to the vehicle center axis and, in the situation shown, parallel to the x-axis 31 of the coordinate system 30. In the embodiment shown, an origin of the coordinate system 30 coincides with the reference point 43. In general, the points on the straight line 3 can be calculated using the following formula:

$$g = \begin{pmatrix} x_g \\ y_g \end{pmatrix} + \psi \cdot \begin{pmatrix} \Delta_x \\ \Delta_y \end{pmatrix}$$

where $\psi$ is an arbitrary real number and $x_g$, $y_g$ represent the coordinates of an arbitrary point on the straight line 3, and $\Delta X$ and $\Delta Y$ are the axis segments of a slope triangle 41. This representation can be converted into the so called Hesse normal form, however. The distance $d_L$ of a straight line to the reference point is the line segment along a normal 42 of the straight line 3 passing through the reference point 43. The perpendicular point 44 of the straight line, which has the coordinates $x_L$, $y_L$, is given by the following equation:

$$P_L = \begin{pmatrix} x_g \\ y_g \end{pmatrix} + \left( \frac{(x_R - x_g) + (y_R - y_g) \cdot \tan(\frac{\pi}{2} - \alpha)}{\Delta_x \cdot \left(1 + (\tan(\frac{\pi}{2} - \alpha))^2\right)} \right) \cdot \begin{pmatrix} \Delta_x \\ \Delta_y \end{pmatrix}.$$

For the distance $d_L$ the following equation applies:

$$g: (x-x_R)\cdot\cos(\alpha) + (y-y_R)\cdot\sin(\alpha) - d_L = 0$$

In order to parameterize a straight line precisely, an angle $\alpha$ measured from a coordinate axis, here the x-axis, for example, is also needed. It is thus demonstrated that each straight line can be assigned a parameter set ($p_1, \ldots p_n$). Hence, a parameter space 50 exists in which each point that is defined by a parameter tuple (d, $\alpha$), ($p_1, \ldots, p_n$) characterizes an object of class K. The point 51 represents the straight line 3. Other points of the parameter space 50 represent other straight lines. In the case of the object type straight line G, this parameter space is two-dimensional. Parameter spaces of other objects may have a higher dimension; for example, the objects of the class of circular objects can be defined by three parameters when a two-dimensional image space or spatial environment is considered, where, for example, the distance between the reference point and the center point, the angle of the straight line connecting the reference point and the center point relative to a coordinate axis, and the radius of the circle represent the three parameters.

In order to be able to decide which objects are actually present in the environment, a discretization of the environment is generally undertaken, which is tantamount to saying that only a certain number of the infinitely many possible objects of the class in the environment are considered. For example, a variation of the distance in 0.01 m steps and an angular resolution of 1° is chosen.

For this now-countable number of objects of a class characterized by the parameters, whose number is further limited by spatially localizing the measurement areas of the environment sensors, the next step is to determine, using the received echo signals, whether these objects are present or not.

In order to make this determination, the finding is first utilized that only certain signal propagation paths are possible, as mentioned above. FIG. 2 shows the possible signal propagation paths for all measurements that can be performed with a pulse echo measurement device 4 comprising four measurement sensors 5-1 to 5-4. These signal propagation paths can be determined mathematically by the means that first the perpendicular points L, $T_i$ for normals 51-1 to 51-4 for the individual measurement sensors are determined. According to the formula provided above, the following results for the perpendicular points:

$$\begin{pmatrix} x_{L,T_i} \\ y_{L,T_i} \end{pmatrix} = \begin{pmatrix} x_{T_i} - \cos(\alpha) \cdot \left[ d_L \begin{pmatrix} \cos(\alpha) \cdot (x_R - x_{T_i}) + \\ \sin(\alpha) \cdot (y_R - y_{T_i}) \end{pmatrix} \right] \\ y_{T_i} - \sin(\alpha) \cdot \left[ d_L \begin{pmatrix} \cos(\alpha) \cdot (x_R - x_{T_i}) + \\ \sin(\alpha) \cdot (y_R - y_{T_i}) \end{pmatrix} \right] \end{pmatrix}$$

The measurement sensors 5-1 to 5-4 are labeled $T_i$ here. With knowledge of these perpendicular points, which at the same time are also reflection points for the pulse echo measurements in which the transmitting transducer itself serves as a receiver, the mirror-image sensor positions can be calculated:

$$\begin{pmatrix} x_{T_i'} \\ y_{T_i'} \end{pmatrix} = \begin{pmatrix} x_{L,T_i} + (x_{T_i} - x_{L,T_i}) \\ y_{L,T_i} + (y_{T_i} - y_{L,T_i}) \end{pmatrix}$$

Only points that are intersection points 70-1 to 70-10 of a connecting line 60-1 to 60-16 between a mirror-image sensor 5-1' to 5-4' and a real measurement sensor 5-1 to 5-4 appear in the measurements as reflection points of the object—here the straight line 3. A total of ten such intersection points 70-1 to 70-10 result, with some lying on multiple transmission paths and connecting lines 60. The positions of the intersection points 70-1 to 70-10 result in accordance with the following equation:

$$\begin{pmatrix} x_{refl,ij} \\ y_{refl,ij} \end{pmatrix} = \begin{pmatrix} x_g \\ y_g \end{pmatrix} + \frac{(y_{T_i'} - y_g)(x_{T_i'} - x_{T_j}) + (x_g - x_{T_i'})(y_{T_i'} - y_{T_j})}{(x_{T_i'} - x_{T_j}) \cdot \Delta_y + (y_{T_i'} - y_{T_j}) \cdot \Delta_x} \begin{pmatrix} \Delta_x \\ \Delta_y \end{pmatrix}$$

The following applies for the transit times $T_{j,i}$ between the individual measurement sensors 5-1 to 5-4 ($T_i$, $T_j$):

$$\tau_{i,j} = \frac{\sqrt{(x_{T_i'} - x_{T_j})^2 + (y_{T_i'} - y_{T_j})^2}}{c}$$

Here, i and j indicate the index of the applicable measurement sensor, where it is assumed that they are sequentially numbered, for example from 1 to 4. The signal velocity in the environment is c.

If one now considers the different transmission paths that are not redundant, it is evident that an echo signal that is caused by a reflection at the straight line 3 can only arise at one point in time in the received echo signal of a transmitter/receiver geometry. Consequently, an echo signal only provides an indication of the presence of a specific object when an echo signal value above a noise threshold arises in the echo signal resulting from the reflection geometry or reflection pattern for the specific transmitter/receiver geometry at the point in time that corresponds to a transit time of a signal propagation through this possible reflection point. In the case of a straight line, neglecting multiple reflections between transmitter, receiver, and wall, this can only be exactly one echo pulse for each echo signal. In the case of objects of other shapes, multiple reflection points, and thus multiple signal transit times at which echo pulses are expected, can also exist for a transmitter/receiver geometry if the object is the only object located in the environment. For this reason, provision is made for the individual transmitter/receiver geometries for each object class K, which is to say for the object class G of straight lines by way of example here, to assign the corresponding characteristic expected transit time $\tau(d, \alpha)$ to the parameter value tuple (d, $\alpha$) that characterizes the corresponding object for each straight line that is characterized or identified by a point in the parameter space. This can take place in the form of a table, for example, in which the corresponding expected signal transit time or times are assigned to the parameter value tuples. Such a compilation is called a reflection pattern R.

In FIGS. 3a to 3d, such reflection patterns $R^{(G)}_i$ for the object class G of straight lines and the transmitter/receiver geometry i are represented graphically by way of example, with the signal transit time $\tau_i(d, \alpha)$ (or, expressed generally, $\tau_i(p_1, \ldots, p_n)$) associated with the applicable parameter space point $P(d, \alpha)$ (or, expressed generally, $P(p_1, \ldots, p_n)$) being indicated via gray scale shading or hatch pattern density. Shown here by way of example are only the reflection patterns for the transmitter/receiver geometries for which measurement sensor 1 is used as the transmitter and measurement sensors 1, 2, 3, and 4 are each used as receivers.

The non-redundant echo signals for a set of measurements are plotted graphically by way of example in FIGS. 4a to 4j. In each case, echo signal intensity is plotted over measurement time, where the measurement time is specified by an index. The measurement time is then given by the index value multiplied by the reciprocal of the sampling frequency. Of course, it is useful to store the expected signal transit times in a like manner as index values based on the employed sampling frequency of the echo signal strength, as well. Since an echo pulse for a specific signal transit time in an echo signal does not characterize a specific point in the environment as a possible reflection point, but instead only a point on a segment of a circle in the center of which is located a measurement sensor used as both transmitter and receiver, or identifies a point on a segment of an ellipse at the foci of which the measurement sensor used as transmitter and the measurement sensor used as receiver are located, an echo pulse in an echo signal provides an indication for the existence of different objects, which is to say different straight lines. All straight lines that represent a tangent to the corresponding segment of a circle or segment of an ellipse have a reflection point whose characteristic expected transit time coincides with that of the corresponding echo pulse. For the individual objects considered in the parameter space (which is to say all points in the parameter space), a weight is now calculated by extracting the characteristic transit time or transit times from the reflection pattern for the associated transmitter/receiver geometry for each detected, non-redundant echo signal, and checking for these points in time or for the associated index values whether the echo signal has an echo pulse at this time position. In this process, a weight value is determined. For example, the echo signal strength at the corresponding point in time or index value or a standard quantity can be used as the weight value if the echo signal value is above a threshold value. It is also possible to compare a standard echo pulse that could be expected at the expected reflection time point to the echo signal at the corresponding time, and to derive a weight value from this. In the simplest embodiment, the echo signal values thus obtained of the different evaluated echo signals for the particular object are used as weight values and simply added in order to obtain the weight for the object. This means that the corresponding expected signal transit time for an echo pulse is determined for the first echo signal using the associated reflection pattern, and the echo signal value at this ascertained time is added to the echo signal value of the second echo signal that occurs at a point in time when an echo pulse is expected in accordance with the reflection pattern for the second echo signal if the corresponding object is present in the environment, etc. For a straight line, therefore, ten weight values $g_i$, for example ten echo signal values $e_i$ or ten standard values, are added in each case. This is represented in the equation below by way of example:

$$W(\alpha, d_L) = \sum_{i=1}^{10} g_i(\tau_i(\alpha, d_L))$$

Instead of the echo signal values, so-called weight values can be used, which are determined using the echo signal values.

Figure 5:
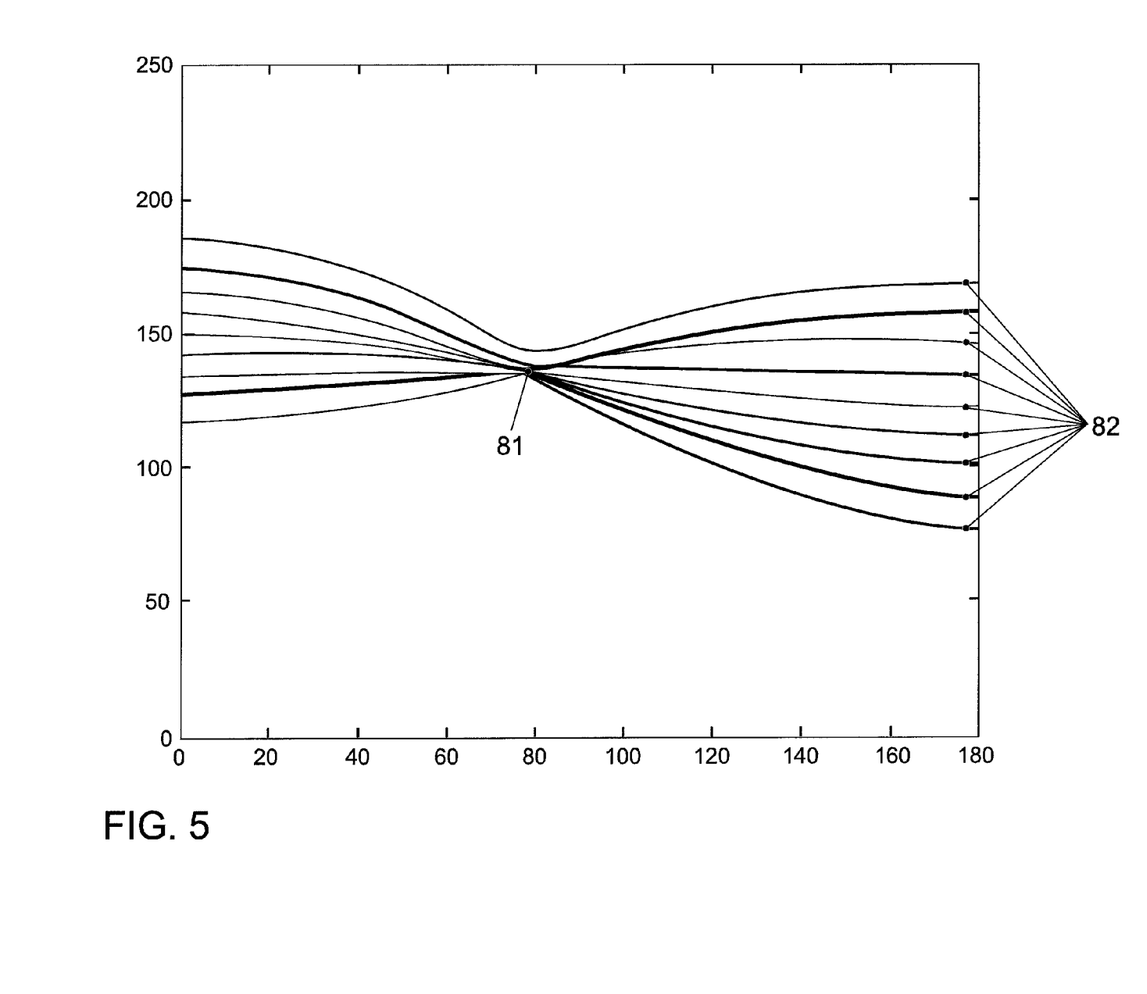
FIG. 5 is a schematic representation of the weights for possible objects in the environment in the parameter space of an object class.

Hence, such a weight W is calculated for all parameter value tuples. If one represents the weights thus obtained through brightness values, then one obtains FIG. 5. Multiple sinusoidal curves 82 intersect at a point 81. This intersection point 81 has the greatest brightness, which provides an indication that the straight line associated with these parameters is present in the environment. If multiple objects are present in the environment, then multiple points of greater intensity will of course appear, which can be used as the basis for inferring the existence of these objects.

One advantage of this method is that detected objects or their associated echo signal components can be removed from the echo signals. To this end, the reflection pattern in the applicable echo signal is used to determine the time when the echo pulse arrived that is reflected at the detected object. The corresponding signal intensity can thus be eliminated from the echo signal. Either the echo signal values at the corresponding point in time or in a region of the environment around the point in time can be set entirely to a signal value that corresponds to a noise value, or else a standard pulse whose time center point coincides with the expected signal transit time, for example, can be subtracted from the echo signal. The echo signals modified in this manner can now be used as a basis for carrying out a new analysis of the same object class or a different object class in order to thus be able to even detect objects that reflect more weakly.

Either as an alternative or in addition, it is likewise possible to ascertain an extent of the object. In this process, a test is made to determine the echo signals in which, for the expected signal transit times that are newly ascertained on the basis of the reflection patterns, an echo signal value that actually corresponds to an echo pulse in the corresponding echo signals is present. If no echo pulse occurs at the expected location for a reflection point, which is to say in an echo signal at the point in time that corresponds to the appropriate reflection point, the conclusion can be drawn therefrom that the corresponding object—the straight line in the example described here—does not extend to the position in the environment where the corresponding reflection point is located.

However, the method described can also be applied to situations in which a relatively small number, or only one, measurement sensor is present, yet the vehicle is moving relative to its environment. In such a case, one or more reflection geometries are precalculated for the transmitter/receiver geometry or transmitter/receiver geometries required for analysis of measurements when the vehicle is at rest.

In the case of measurements taken sequentially in time, when the problem is considered, a position of the reference point linked to the vehicle changes relative to the stationary objects. In this approach, this reference point, and thus also the parameter space linked thereto, are viewed as linked to the signal echo measurement device. Consequently, the corresponding parameters relative to the reference point that has now moved on, and relative to the parameter space linked thereto, change for the objects in the environment. The parameter spaces associated with different vehicle positions are different, so that one and the same parameter tuple identifies different objects in different parameter spaces. In this approach, this is solved by a transformation of the different parameter spaces to one another so that the measurement signals detected and analyzed in a moving vehicle at different points in time, which is to say at different locations, can be combined in parameter space. Hence, if multiple sensors are installed in the vehicle so that multiple echo signals are detected simultaneously for each point in time, the precalculated reflection patterns can be used to undertake an analysis of the echo signals in the relevant "current" parameter space associated with the reference position of the current vehicle position. Since the reference point changes with respect to the stationary objects from one measurement point in time to the next, however, a transformation of these parameter spaces to one another is necessary in order to combine analyses of measurements carried out at different locations in a parameter space for a stationary reference point. The transformations are dependent on the movement of the vehicle.

Another approach proceeds from the assumption that the identification and characterization of the individual objects takes place in each case with respect to the reference point first used, which is assumed to be stationary in the environment, thus the reflection patterns must be adapted because of the vehicle motion to the effect that the expected signal transit times for the transmitter/receiver geometry have now changed.

The two approaches are equivalent. The changes can be calculated on the basis of geometric considerations for the vehicle movement that has occurred in each case.

In particular, when only one sensor is used, analysis in accordance with the second approach is generally advantageous. For the object class of straight lines, the values for the expected transit time for an angular value can all be adjusted by the same amount in the reflection pattern. The size of the adjustment again depends on the vehicle movement. If the parameter values are arranged in a matrix-like table so that the row numbers are linked to the distance and the column numbers are linked to the angle in the parameter space, then each of the values in a column should be changed by the same amount dependent on the translation of the vehicle in space. A rotation of the vehicle (of the measurement device) in space must be compensated for by a "shifting" of the columns, which is to say a change in the assignment of the angular position to the columns.

While an adjustment of the movement in the image space would require a multiplication of each image point by a rotation matrix and a subsequent shift, the mapping of the corresponding objects in the parameter space can be realized by a much smaller number of translations. In all, n+1 translations are required, where the number n is determined by the angular region considered and the angular resolution.

The following applies: n=angular region: resolution. For example, if an angular region of 180° with an angular resolution of 1° is considered, then 180+1 translations are required. In the first place, namely, the distance of the straight line from the moved reference point changes, where this change in distance is angle-dependent, so this change in distance must be calculated once for each angle. The change in distance as a function of the rotation angle of the pulse echo measurement device relative to the objects is calculated using the following equation:

$$\Delta d(\alpha) = \cos(\alpha) \cdot (x_{P1} - x_P) + \sin(\alpha) \cdot (y_{P1} - y_P).$$

$(x_p, y_p)$ and $(x_{p1}, y_{p1})$ specify the coordinates of the vehicle. In addition, another translation is required because of the rotation about the angle $\gamma$ of the vehicle relative to the objects:

$$\alpha_{P1} = \alpha_P + \gamma$$

Figure 6:
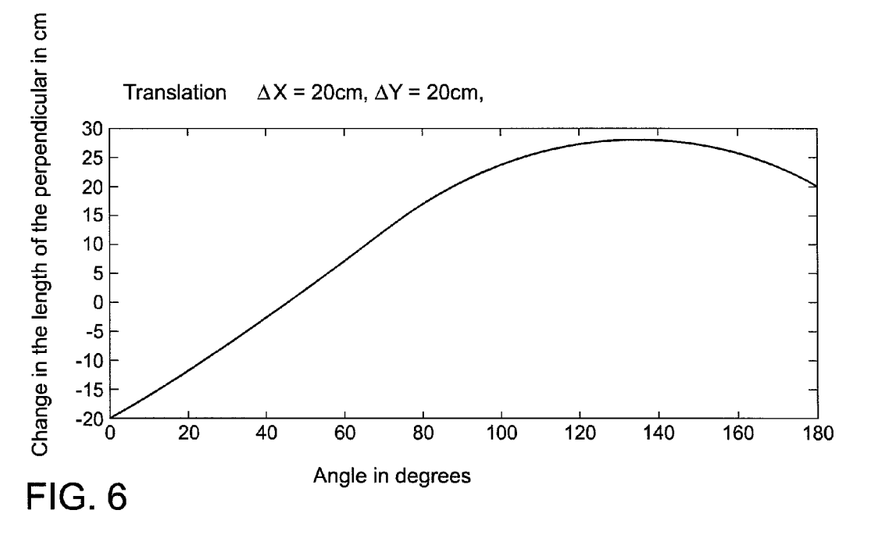
FIG. 6 is a change in distance of the straight lines as a function of the angle during a vehicle translation by 20 cm in an X direction and 20 cm in a Y direction of a two-dimensional space.

In FIG. 6, the changes in distance for the individual straight lines are plotted graphically as a function of the angle parameter $\alpha$ for a translation of 20 cm in the x-direction and 20 cm in the y-direction. In consequence, it becomes possible to calculate a synthetic measurement arrangement with a large number of measurement sensors, and hence of transmitter/receiver geometries. The analysis as described above can thus also be undertaken with a plurality of sequentially detected pulse echo measurements that are carried out, for example, with one measurement sensor that moves relative to the objects along with the vehicle through the environment. Yaw information and translation information describing the movement of the vehicle is generally provided by other vehicle systems, or can be ascertained using integrated sensors.

In addition, it should be noted that transformation to one another of the parameter spaces carried along by movement, and also adaptation of the reflection patterns, can only be undertaken for limited travel distances at a time, since the transformation or the adaptation lead to "distortions" of the transformed parameter space, which makes for difficulty in assigning the parameter tuples of the transformed parameter space to the parameter tuples of the parameter space linked to the stationary reference point. Adaptation of the reflection geometry behaves similarly. Consequently, the stationary reference point must be defined anew after a predetermined distance has been traveled. It is useful for the objects previously ascertained in the parameter space to then be converted or transferred into the image space. The measurement results thus analyzed in the parameter space can then continue to be combined iteratively in the image space, for example in a map of the environment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting objects in an environment of a vehicle, the method comprising:
    ascertaining at least one reflection pattern, which is stored or programmed in a memory or circuit, for at least one object class, wherein a reflection pattern for a mapping geometry of a pulse echo measurement assigns to each parameter value tuple that characterizes an object of the object class in the environment an expected transit time at which an echo pulse is expected in an echo signal if only a corresponding object characterized by the parameter value tuple is present in the environment;
    performing pulse echo measurements for different transmitter/receiver geometries;
    detecting echo signals in the pulse echo measurements;
    calculating weights for different objects of the corresponding class characterized by the parameter value tuple in that, for each echo signal, one or more weight values are ascertained using the echo signal value or echo signal values for a point or points in time corresponding to an expected transit time or transit times that is or are associated with the parameter value tuple using the reflection pattern associated with the echo signal;
    summing the weight values ascertained to form a weight; and
    ascertaining a presence of objects of the at least one object class using the weights ascertained.

2. The method according to claim 1, wherein the reflection pattern is calculated before detection of the echo signals.

3. The method according to claim 1, wherein the echo signal values with which the weight values are ascertained are used as weight values.

4. The method according to claim 1, wherein at least one reflection pattern for a transmitter/receiver geometry is precalculated, and wherein at least one additional reflection pattern is calculated from the at least one reflection pattern taking into account a vehicle motion between recording times of associated echo signals.

5. The method according to claim 1, wherein a presence of an object is ascertained using a threshold condition for corresponding weights of a relevant class.

6. The method according to claim 1, wherein an extent of a detected object is ascertained in that tests are made from the individual echo signals to determine whether or not the echo signal value or echo signal values for the point in time or points in time corresponding to the expected transit time or expected transit times which, based on the reflection pattern associated with the echo signal, is or are assigned to the parameter value tuple characterizing the detected object exceeds or exceed a predefined quantity, and wherein an echo signal value below the predefined quantity or the predefined additional threshold value is an indicator that the detected object does not extend to a reflection point at which a reflection of the transmit pulse at the detected object takes place in an associated transmitter/receiver geometry if the object is completely extended according to an assumption underlying a parameterization as a parameter value tuple.

7. The method according to claim 1, wherein modified echo signals are generated such that signal components associated with detected objects are removed from the echo signals.

8. The method according to claim 1, wherein the weights are recalculated using modified echo signals.

9. The method according to claim 1, wherein the objects are inserted into a map of the environment in which each spatial cell is assigned a probability, wherein the insertion is carried out using a probability approach based on the Bayesian theorem, and wherein spatial points corresponding to a contour of the detected object are first assigned an existence probability for the object.

10. A device for detecting objects in the environment of a vehicle, the device comprising:
    a pulse echo measurement device detecting echo signals;
    a controller having a memory device for storing at least one reflection pattern for a transmitter/receiver geometry of the pulse echo measurement device; and
    a computing unit that analyzes the echo signals according to the method of claim 1.

* * * * *